Jan. 15, 1963     E. SCHASCHL ET AL     3,073,154

CORROSION AND FLUID-VELOCITY TEST PROBE AND METHOD

Filed Dec. 15, 1958     2 Sheets-Sheet 1

INVENTORS
EDWARD SCHASCHL
BY GLENN A. MARSH

ATTORNEY

Jan. 15, 1963   E. SCHASCHL ET AL   3,073,154
CORROSION AND FLUID-VELOCITY TEST PROBE AND METHOD
Filed Dec. 15, 1958   2 Sheets-Sheet 2
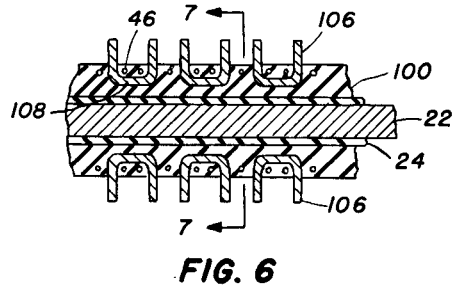
FIG. 6
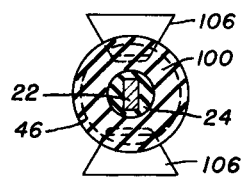
FIG. 7
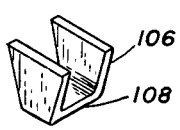
FIG. 8
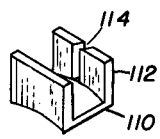
FIG. 9
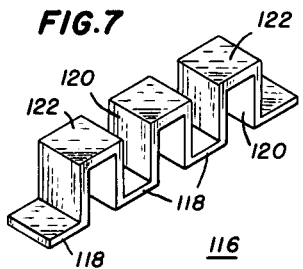
FIG. 10
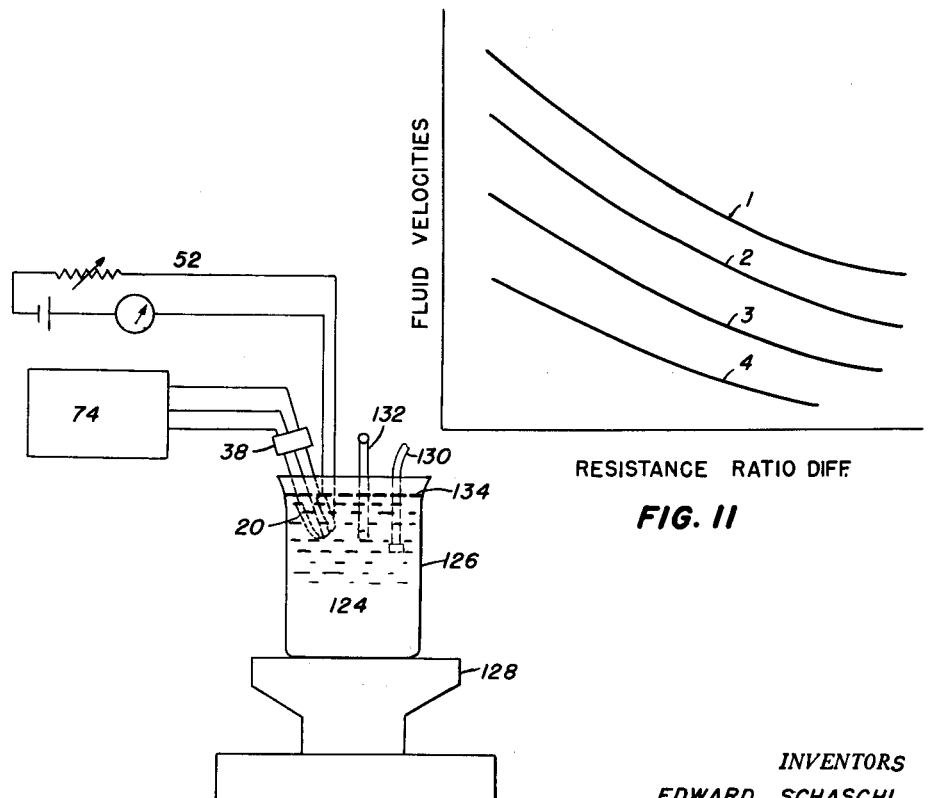
FIG. 11
FIG. 12
INVENTORS
EDWARD SCHASCHL
BY GLENN A. MARSH
ATTORNEY

United States Patent Office 3,073,154
Patented Jan. 15, 1963

---

3,073,154
CORROSION AND FLUID-VELOCITY TEST PROBE AND METHOD
Edward Schaschl and Glenn A. Marsh, Crystal Lake, Ill., assignors to The Pure Oil Company, Chicago, Ill., a corporation of Ohio
Filed Dec. 15, 1958, Ser. No. 780,557
19 Claims. (Cl. 73—86)

This invention relates to a corrosion-test probe having, in combination, means for determining the corrosion of a metal in a fluid and means for determining the flow velocity of the fluid. In another embodiment, the invention relates to a corrosion-test probe having, in combination therewith, means for determining the flow velocity of the corrosive fluid being tested and the temperature of said corrosive fluid. The invention also relates to the method for determining the corrosion of a metal in a fluid and at the same time determining the flow velocity and/or temperature of the fluid.

Corrosion-test probes which are temperature-compensating have been disclosed in certain previous patent applications by the present inventors. These devices take advantage of the methods that have been developed to make use of the correlation of the change in electrical conductivity with change in cross-sectional area, due to corrosion, to determine the rate of corrosion of various metallic materials of construction. These corrosion-test probes have test elements mounted on base elements and are connected to electrical resistance-change meter circuits. The basic problem with which this invention is concerned is that of determining the corrosivity of a fluid simultaneously with the flow velocity of the fluid. The corrosion rate of a metal in contact with a fluid is often dependent, to a large extent, on the velocity of flow of the fluid. This is true when the metal is in contact with a liquid medium containing a component which promotes corrosion, for example, a system wherein steel is in contact with an aqueous salt solution containing dissolved oxygen. In such a system the corrosion rate is controlled by the rate at which oxygen is made available to the metal surface, and this in turn is dependent on the fluid flow velocity. It is apparent that under these conditions a high corrosion rate may be due to a high fluid flow velocity in conjunction wtih the general level of corrosiveness of the fluid. Consequently, in determining various possible means of decreasing corrosion rate in a particular environment, it is highly advantageous to know which of these factors is principally responsible for the high corrosion rate in order that effective countermeasures can be taken. It is also advantageous to be able to determine the effects of corrosion mechanisms. In this connection, the present device also is adapted to measure the temperature of the corrosive environment.

It becomes, therefore, a primary object of this invention to provide an apparatus for determining the corrosivity of a fluid environment.

A further object of the invention is to provide an apparatus for determining the corrosivity of a fluid environment, while at the same time determining the flow velocity thereof.

Another object of the invention is to provide a method and apparatus which are adapted to measure the corrosivity, flow velocity and temperature of a corrosive environment.

Further objects of the invention will become apparent as the description thereof proceeds.

The invention is best described by reference to the drawings wherein:

FIGURE 6 is a partial view in cross-section of another arrangement of radiating fins to be used with the test element of this invention.

FIGURE 7 is a cross-sectional view of the embodiment shown in FIGURE 6 taken along lines 7—7.

FIGURE 8 is an isometric view of another form of radiating fin that may be used to fabricate a test element of this invention.

FIGURE 9 is an isometric view of still another form of radiating fin that may be used to fabricate a test element of this invention.

FIGURE 10 is an isometric view of another form of radiating element.

FIGURE 11 is a graph with fluid velocities as the ordinates and resistance ratios as the abscissas to illustrate the types of measurements that can be obtained by the apparatus of this invention.

FIGURE 12 is a view of one type of apparatus set-up that may be used to illustrate the use of the invention.

Figure 1:
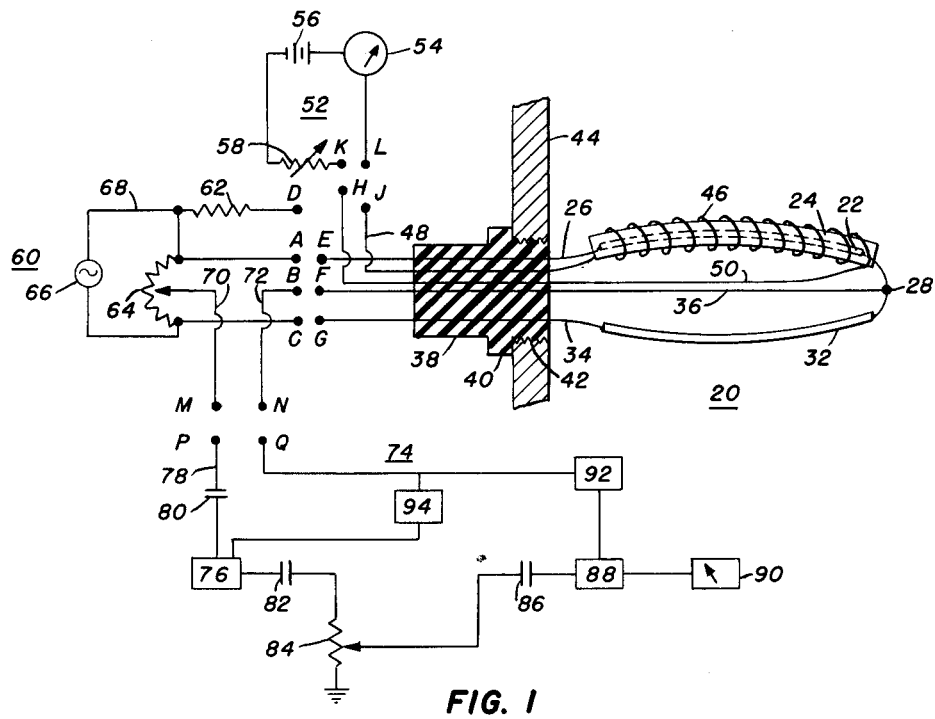
FIGURE 1 shows a cross-sectional view of one form of corrosion-test probe with associated measuring circuit, part of which is shown diagrammatically.

For simplification in these drawings, corresponding and related parts have been given the same or related numbers and letters. It is to be understood that the elements, parts, circuitry and auxiliary apparatus shown in the drawings are merely illustrative of the invention and not to be limiting thereon. One skilled in this art will realize that certain switches, batteries, generators, rectifiers, and like devices have been omitted for purposes of clarity. It is also apparent that equivalent parts may be substituted for those shown without departing from the spirit of the invention.

A feature of this invention is the provision in combination, of a corrodible test element and a protected test element connected in series with a common junction, and resistance means associated with said protected test element to measure fluid flow-velocity and fluid temperature of the environment under test. Another feature of the invention is the provision of an anemometer in cooperation with a corrosion-test probe, and in combination with a circuit adapted to measure the rate of heat dissipation, to determine the rate of fluid flow and the temperature of the environment.

Referring in detail to FIGURE 1, the number 20 refers to the test probe elements and associated parts. Test probe 20 comprises protected resistance element or specimen 22 which is covered with corrosion-resistant coating 24 shown extending over all sides and the ends of resistance element 22 to protect same from the corrosive atmosphere. Element 22 is connected to lead wire 26 at one end and to common junction 28 at the other end. Coating 24, by preventing the corrosion of element 22, enables this element to compensate for temperature fluctuations as will be explained.

The test probe also includes resistance element 32 which has electrical properties and a composition substantially the same as element 22. Element 32 is connected to common junction 28 at one end, and to lead wire 34 at the other end. Electrical leads 26 and 34 along with common lead 36 may serve as the support for the test-probe elements and associated parts. For this purpose, they are sufficiently rigid and are imbedded through insulating base 38 having flange 40 and threaded portion 42 for attachment in sealed relationship through wall 44, which represents the vessel confining a corrosive atmosphere. Lead 26 terminates at terminal E, common lead 36 terminates at terminal F, and lead 34 is connected to terminal G.

A feature of this invention is the provision of resistance wire 46, having leads 48 and 50 terminating at terminals H and J. Leads 48 and 50 extend through base member 38 in sealed relationship. Although resistance wire 46 is shown in the form of a coil around protected element 22, any form may be used as long as resistance wire 46 has a relatively large surface exposed to the influence of the corrosive atmosphere and is in closely spaced association with element 22, so as to be responsive to temperature changes.

FIGURE 1 also shows the circuits and switches necessary to allow test resistance elements 22 and 32, along with resistance wire 46, to function as means for measuring the corrosion rate, and means for determining the temperature and fluid flow-velocity of the corrosive environment, respectively. These circuits include heater circuit 52, which comprises meter 54, battery 56, and variable resistance 58 connected in series between terminals K and L, and bridge circuit 60. Bridge circuit 60 includes fixed resistance 62 connected to terminal D, and variable resistance 64 connected in series therewith to terminal C, with alternating-current source 66 connected in parallel with variable resistance 64 by means of line 68. Circuit 60 has terminal A branching from one end of variable resistance 64 and terminal C connected to the other end thereof. Rheostat contact 70 is connected to terminal M. Also, a third terminal B is connected to terminal N through line 72.

Opposite to terminals M and N are terminals P and Q connecting bridge circuit 60 and heater circuit 52 along with the probe elements as will be described, to electrical resistance-change meter 74. This latter circuit is an electronic device designed to directly indicate proportional changes in resistance of test probe 20 and resistance 46, depending on the connections that are made between the various terminals. Electrical resistance-change meter 74 is described in detail in United States Patent 2,830,265, dated April 8, 1958, by L. E. Ellison. The components of this circuit are shown in block diagram. The impulse across terminals M and N is a source of small voltage change, with test element 22 functioning as a corrosion-sensing element forming one branch of the bridge. Any voltage output or electrical unbalance in circuit 60 is fed to high-gain amplifier, represented by block 76, through lead 78 and condenser 80. Amplifier 76 is connected through condenser 82, grounded variable resistor 84, and condenser 86 to phase detector 88 and meter 90. A.C. supply 92 is connected between phase detector 88 and terminal Q, and D.C. supply 94 is connected from one side of the A.C. supply 92 to amplifier 76. In the operation of circuit 74, the signal received by amplifier 76 is amplified to a voltage of sufficient magnitude to operate phase detector 88, which in turn operates meter 90 to show the percentage of corrosion as a direct meter reading.

In use, test probe 20 and circuits 52, 60 and 74 shown in FIGURE 1 are operated as follows. The probe 20 is installed in a fluid under study and the initial ratio of resistances of test elements 22 and 32 is determined by means of circuit 74 through the connection of terminal M to terminal P and terminal N to terminal Q and taken as a reading on meter 90. To accomplish this, terminals A and E, B and F, and C and G are connected. Then after the test probe 20 has been subjected to contact with the corrosive fluid for a period of time, the ratio of these resistances is again determined. The change in ratio is proportional to the extent to which test element 32, which is exposed to the corrosive fluid, has corroded during the test period. Since test element 22 is not corroded but is subjected to the same temperature changes as element 32, any changes in resistance due to changes in temperature are automatically compensated for, as described in the aforesaid patent.

One object and feature of this invention is to provide means for measuring and differentiating between the effect of corrosiveness due to chemical action, physical abrasion, or both, and corrosion due to the velocity of flow of the fluid being tested.

This objective is accomplished by including in test probe 20 means to sense the rate of dissipation of heat which is translatable to flow velocity and actual temperature of the environment, namely resistance 46 and circuit 52 in cooperation with circuits 60 and 74. To accomplish this objective, it is only necessary to pass a preselected amount of current from battery 56 by means of variable resistance 58 through connection of terminal K to H, and L to J. The amount of such current is indicated on meter 54. As a result, resistance 46 heats up and also heats test element 22.

When the fluid under study is quiescent, test element 22 will reach a certain temperature at which the amount of heat dissipated into the fluid is equal to the amount of heat supplied by resistance 46. Under these conditions of equilibrium, element 22 remains at this certain temperature. Under dynamic conditions with the test environment flowing past the test probe 20, this heat will be abstracted from element 22 and resistance 46 in accordance with the known principles of hot-wire anemometry and the temperature attained by test element 22 at the same power input, as indicated by meter 54, will be lower than when the fluid is quiescent. Since the resistance of test element 22 is proportional to the temperature reached under equilibrium conditions, and since the temperature and resistance of test element 32 remain unchanged as test element 22 is heated, the ratio between the resistances of test element 32 and test element 22 will also be proportional to the equilibrium temperature of the heated element. This is true, of course, as long as element 32 does not corrode and change in resistance. To off-set this result, the switching means are provided so that immediate change-over can be made and readings taken before the corrosion of element 32 changes the equilibrium condition. Accurate measurements can be made under most conditions by taking the readings successively.

It follows that this ratio of resistances is also proportional to the rate at which heat is dissipated from heated element 46, which is a direct function of fluid flow velocity. Consequently, the following relationship is established:

$$\frac{\text{Resistance of test element 32}}{\text{Resistance of unheated test element 22}} - \frac{\text{Resistance of test element 32}}{\text{Resistance of heated test element 22}}$$

$$= \text{or} \approx \text{Fluid flow velocity}$$

From this information, it can be determined whether corrosion of test element 32 is due primarily to a high level of chemical or physical attack, or to a lower level of corrosiveness plus a high velocity of flow, and thus suitable corrective steps can be taken to overcome the corrosion or erosion problem.

The apparatus of this invention as a feature and objective thereof is also adapted to operate as a resistance thermometer to determine the actual temperature of the fluid environment confined by wall 44 and in contact with probe 20. This employs the well-known principles of resistance thermometry and is accomplished by connecting terminal C to J, B to H, and D to H. Suitable switching means or jack-and-jumper arrangements can be used to make these and the other connections referred to herein for the various measurements as desired. The three types of observations so far discussed are summarized in the following table:

TABLE I

*Table of Measurements*

| Desired Observation | Lead Connections | Read |
| --- | --- | --- |
| Corrosion | A→E<br>B→F<br>C→G | Microinches of metal on dial of variable resistance, when suitably calibrated, between two observations |
| Fluid Velocity | A→E<br>B→F<br>C→G<br>K→H<br>L→J | (1) Dial reading at null point, with no current in heater.<br>(2) Dial reading at null point, with current in heater.<br>Difference between (1) and (2) is proportional to fluid velocity. |
| Temperature of Environment | C→J<br>B→H<br>D→H | Resistance of wire, which is proportional to temperature. |

The dial reading (1) at null point adjusts for any previous corrosion loss of test element 32 prior to a fluid velocity determination. Reading (2) is taken soon enough after reading (1) so that there is no change in the resistance of test element 32 due to corrosion in the interim.

The accurate use of the device of this invention is dependent in part on rapid heat dissipation and provision of previously prepared correlations of "resistance ratio differences" versus fluid velocity. The former of these requisites is supplied by providing an extended surface around a substantial portion of the protected test element 22. Various forms of fins having extended, heat-dissipating surfaces may be used for this purpose. Illustrative embodiments are shown in FIGURES 2, 3, 4 and 5.

Figure 2:
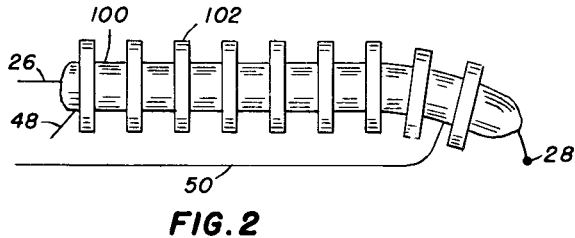
FIGURE 2 is a side view of another form of test element that may be used in accordance with this invention.
Figure 3:
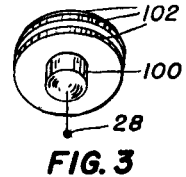
FIGURE 3 is an end view of the embodiment shown in FIGURE 2.
Figure 4:
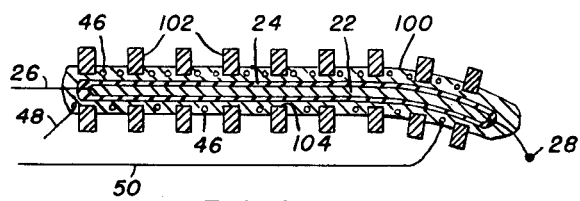
FIGURE 4 is a cross-sectional view of the test probe shown in FIGURE 2.
Figure 5:
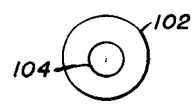
FIGURE 5 is a side view of one of the radiating discs shown in FIGURE 4.

FIGURE 2 is a plain side view of a protected test element, having common junction 28, lead 26 and encased in a plastic insulation 100 for the purpose of attaching fins 102 thereto. Fins 102 extend radially from insulation 100. The cross-section in FIGURE 4 shows the relationship of these parts with insulation 100 retaining coil 46 and covering protective coating 24, with fins 102 (in the form of thin discs having central apertures 104) held in place thereby. The test element shown in FIGURES 2 and 4 may be curved at the end as shown, or generally arcuate, or straight, the shape thereof being a matter of choice to facilitate connection to junction 28 and extension of lead 26 into supporting base member 38. The test element shown in FIGURES 2 and 4 is a modification of the test element 22 in FIGURE 1 and may be used in its stead. FIGURE 3 shows an end view of FIGURE 2, and in FIGURE 5 there is shown a side view of one of the fins or discs 102.

In FIGURES 6 and 7 a partial cross-sectional view and end view of another form of finned-protected test element is shown with test element 22 encased in non-corrodible coating 24 and outer insulating coating 100 with double-lobed fin members 106 imbedded therein. In this embodiment, coil 46 is wound through each double-lobed fin member in close proximity so as to provide maximum radiation due to the passage of the fluid between the extended portions of the lobes and between spaced lobes or fins. FIGURE 8 shows the shape and proportions of fin member 106 with connecting cross-member 108.

FIGURE 9 shows another form of double-lobed fin member with an arcuate cross-member 110 and rectangular fins 112. Diagonal transverse slots, as 114, may be provided in the lobes so that coil 46 may be wound therebetween to promote winding of the coils and assembly, in addition to providing further extended radiation surfaces.

In FIGURE 10 a modified fin 116 is shown having base members 118, vertical walls 120 and transverse connecting members 122. Fin 116 is easily attached to a coated test element by placing the bases 118 against the coated or taped test element and applying an insulating plastic to the top surfaces of members 118 so that the plastic covers same, as member 108 in FIGURE 6; then resistance element 46 is wound over the top of bases 118 between walls 120 by placing two or three winds in each space and finally covering the resistance element with additional plastic, leaving a substantial portion of walls 120 and all of connecting members 122 exposed.

The test elements 22 and 32 in general have substantially the same electrical resistivity, which means that they will also have substantially the same cross-section area and chemical composition. This is a tentative requirement in order that the bridge-measuring circuits 60 and 74 may be made to function accurately without tedious calibration. However, it is unnecessary that the configuration or total electrical resistance of the protected and unprotected test specimens be identical. This is because the corrosion-measuring process with which the test probe of this invention is utilized entails a comparison method for determining the change in resistance of the protected test specimen when exposed to corrosive conditions, that is, the bridge circuit in which the test probe is installed during use is initially balanced by adjusting the ratio of the resistance or test elements. Accordingly, the test elements may be in any cross-sectional form such as cylindrical, diagonal, square, hexagonal, etc.

The test elements 22 and 32 are ordinarily made of materials of construction under investigation or in use in the process vessel or apparatus for which corrosion rates are desired. As a typical example, the test specimens may be constructed of steel in the form of foil-like strips measuring 0.001″ x 0.125″ x 3.0″. The materials of construction include any which have the property of conducting electricity and show a change in resistance proportional to changes in cross-sectional area due to corrosion. The materials of construction that meet these requirements include all metal and metal alloys such as steel, bronze, copper, brass, and the like.

Suitable material that may be used to form protective coating 24 includes Teflon, paper and fabric laminates such as the phenolic and epoxy resins and other synthetic and plastic coatings. These materials, described in "Materials and Methods," volume 42, No. 1, July 1955, exhibit good metal-bonding-strength, flexing strength and arc-resistance, and are of low cost. Some plastic coatings can not be used where the maximum operating temperatures of the test probe exceed about 250° F. Silicone coatings may be used at temperatures as high as 300° F. Ceramic insulators such as titanite, steatite, glass-bonded mica and glass-bonded synthetic mica withstand higher temperatures and may be fabricated and used at temperatures as high as 650° to 750° F.

The foregoing materials may also be used as the insulating material 100 since they exhibit both good insulating and corrosion-resisting properties. Other examples of materials that may be used both for corrosion protection and insulation to hold the fin members include such proprietary compounds as Tygon paint (American Chemical Company, Ambler, Pa.); Armstrong A-2 adhesive; carbolene; phenoline 300; Scotchcast resin-MMM; Saurereisin cement; fluorinated ethylene polymers, such as Kel-F; and polyethylene, or any corrosion-resistant, relatively non-conducting coating having chemical resistance and the ability to transmit heat. These and other plastic materials of construction are described in detail in "Modern Plastics Encyclopedia," volume 33, No. 1A, 1955, published by Plastics Catalogue Corporation.

These coatings should be of sufficient thickness to provide protection to the coated test element and adequate support for the finned members. The coating may be applied by spraying, dipping, brushing, etc., as amenable to the particular type of coating chosen.

The finned members 102, 106, 112 and 116 may be made of any material having good heat-conducting properties such as metal alloys, aluminum, and the like. Likewise, the base member 38 is constructed of a suitable material having electrical insulating properties and of sufficient strength to provide support for the test probe 20 and the leads 26, 34, 36, 48 and 50. Examples are Bakelite, hard rubber, etc.

The corrosive atmosphere may be gaseous, vaporous, semi-solid or a mixture of these forms of matter. Examples include corrosive gases such as halogen, acidic or basic solutions, flue gases, and mixtures of gases or carrier liquids containing a high content of solids, such as catalyst particles in a fluid system. These atmospheres may be considered to be corrosive either because of their mechanical or chemical effects, or combinations of same, which result in loss of portions of the exposed test specimen 32.

In order to further illustrate the invention and its use, based on the provision of previously prepared correlations of "resistance ratio difference" vs. fluid velocity, the following examples are given: Since these relationships are affected by heat-transfer coefficients, specific heat, and the like, which in turn are dependent upon the physical properties of the particular fluid under study, the correlations must be prepared for the fluid under study before undertaking a field investigation.

First, the probe 20 is positioned in a quiescent bath of the fluid to be studied, and the temperature of the bath is adjusted to a level lower than the anticipated test temperature. The ratio of the resistance of test element 22 to the resistance of test element 32 is noted. Following this, a preselected amount of current, as for example about 0.5 amp. at 6 volts, is applied to resistance 46 and the ratio of the resistance of test element 22 to test element 32 is again noted. This difference represents the lowest extremity of the correlation at the temperature chosen. Thereafter, the fluid is caused to flow over the probe 20 at several known velocities, and the ratio of these resistances is noted at each velocity. The difference between these ratios and the ratio noted in the quiescent bath with no current applied to coil 46, when plotted against fluid velocity, results in a smooth curve such as curve 1 shown in FIGURE 11.

This procedure is repeated at each of several temperature levels, with the range of temperatures being selected to encompass temperatures anticipated during subsequent field tests. When a series or all of the curves are plotted on common axes a correlation chart such as is illustrated by curves 2, 3 and 4 of FIGURE 11, is obtained. When the probe is then used in a field test, the corrosion loss is determined by using the probe in conventional corrosion-determining manner, the fluid velocity is determined by applying the preselected current through the resistance 46, following the determination of the difference between the resistance ratios with and without current flowing through resistance 46, and finally reading the fluid velocity from the calibration chart at the determined difference in these ratios.

The accuracy of the instant invention and the influence of velocity or resistance ratio, at various current inputs, to resistance 46, is hereinafter demonstrated by use of the experimental arrangement shown in FIGURE 12. In FIGURE 12 the corresponding parts from FIGURE 1 bear corresponding numerals shown with lesser detail to include heater circuit 52, measuring circuit 74, test probe 20, and base member 38 as the measuring instrument. In this example, the corrosive atmosphere is represented by fluid 124 in beaker 126 supported on hot plate 128 and equipped with aerater or stirrer 130. Thermometer 132 is used to check the temperature of the liquid 124. The entire test probe 20 is immersed in the liquid 124 as indicated by liquid level 134 thereabove. In this experiment the fluid 124 was water. The results are reported in Table II.

TABLE II

| Temp. | Degree of Agitation (by air) | Dial Reading at null Point | Heater Current (milliamperes) |
| --- | --- | --- | --- |
| Room (about 25° C.) | Violent | 265 | 0 |
| Room | do | 263 | 200 |
| Do | None | 261 | 200 |
| Do | Violent | 260 | 320 |
| Do | None | 253 | 320 |
| Do | Violent | 253 | 500 |
| Do | None | 237 | 500 |
| 138° F | Violent | 268 | 0 |
| 135° F | do | 254 | 500 |
| 128° F | None | 247 | 500 |

The method of this invention is carried out for the purpose of determining the corrosivity, fluid flow-velocity, and temperature of the environment under consideration. Measurements may be made of the corrosivity alone, or the fluid flow-velocity alone, or similarly, the temperature alone. In applying the method, the following steps are applied:

(1) A corrodible test element composed of a metallic material of construction is exposed to the flowing corrosive environment.

(2) A protected test element composed of the same material of construction and having similar chemical and electrical properties, unless calibration is practiced, is also exposed to the environment.

(3) A resistance element preferably protected from the corrosive environment, or of corrosion-resistant material, is likewise contacted with the environment.

(4) Changes in resistance of the resistance element due to the heat imparted thereto by the environment are sensed and recorded as functions of temperature.

(5) The rate of corrosion of the exposed test element is determined by measuring the change of resistance thereof, due to changes in cross-sectional area (due to corrosion), by applying the electronic resistance-change meter thereto. This is accomplished by impressing a signal proportional to the change in resistance into an amplifier circuit and a phase-detecting circuit, and comparing the amount of added resistance necessary to balance the circuits with the original resistance, which value, after suitable calibrations, may be read directly in microinches of corrosion on meter 50.

(6) The fluid flow velocity is determined by obtaining the ratio of resistance of the uncorroded test element with the resistance of the unheated test element, applying a measured amount of current to the resistance element, obtaining the resistance of the heated test element and its ratio to the resistance of the uncorroded test element, and determining the differences of these ratios as a function of the fluid flow-velocity of the environment.

Broadly, the apparatus invention relates to the test elements, such as 22, the test probe 20 with or without the circuits 52, 60 and 74, together, singly, or in combination therewith.

The method and test probe of this invention, with cooperating resistance element exposed to the heat dissipating effect of the corrosive environment due to fluid flow and also exposed to the heat and corrosiveness thereof, is useful in rapidly establishing the relative corrosiveness of an environment, distinguishing between metal loss due to mechanical abrasion or fluid flow and metal loss due to chemical action, measuring the rate fluid flow, and measuring the temperature of the environment. This test probe and associated circuits can be used in a variety of applications including that of classifying metals or metal alloys according to their corrosion resistance, classifying media in accordance with their relative corrosivities and determining the effect of fluid flow past the test probe. The device may be used to measure the corrosivity of crude oil, evaluating corrosion inhibitors, determining corrosion levels in water treating systems, determining alloy resistance in oil refinery streams where oxidation may be selective, determining the relative corrosivity of several refinery runs at different operating conditions, for gasoline plant corrosion studies, and such special corrosion problems as on ocean-going vessels or inside tankers; also, the device may be used to measure the corrosion rate of lead or other bearing metals, if desired, in the crankcase of an engine. All of the foregoing measurements can be correlated with the temperature and fluid flow velocity of the environment past the test probe.

In the claims the term test element or test specimen is to be interpreted as including all forms of elongated bodies of various metallic materials of construction, of whatever shape, size, curvature or cross-section, which are used as elements 22 and 32 or their equivalents in a device of this kind, and also includes the combination of the coating 24, resistance element 46 of whatever configuration, whether exposed or imbedded with or without the leads 48 and 50, and with or without the heat-dissipating means or finned members 102, 106, 112 and 116. The term test probe is intended to include the combination of at least two of such test elements joined at a common junction at one end with or without the electrical leads 26, 34 and 46 associated therewith or the base member 38. The term corrosion, temperature, and fluid flow velocity measuring device or similar language is intended to include the test probe as above defined with associated circuits 52, 60 and 74, together or separately. The only limitations attaching to this invention appear in the appended claims.

What is claimed is:

1. A device of the character described comprising a protected resistance element, an exposed resistance element, said resistance elements being connected at one end to a common juncture, a third resistance element adjacent to said protected resistance element, a source of measured current, a bridge circuit, multi-position switch means successively for connecting said protected resistance element and said exposed resistance element as adjacent resistance arms of said bridge circuit and for connecting said source of measured current to said third resistance element.

2. A device of the character described comprising a protected resistance element, an exposed resistance element, said resistance elements being connected at one end to a common juncture, a third resistance element adjacent to said protected resistance element, a source of measured current, a bridge circuit including a comparative resistance measuring means, multi-position switch means for connecting said protected resistance element and said exposed resistance element as adjacent arms of said bridge circuit whereby the corrosion rate is measured by said comparative resistance measuring means as a function of the change in cross-sectional area of said exposed resistance element in one position, and to connect said source of measured current to said third resistance element in a second position to heat same whereby the difference between the ratio of the resistance of said exposed resistance element to the resistance of the unheated protected resistance element and the ratio of the resistance of said exposed resistance element to the resistance of the heated protected resistance element is measured by said comparative resistance measuring means as a function of the fluid-flow velocity.

3. A device of the character described comprising an exposed resistance element, a protected resistance element having a coating on the entire surface thereof, said resistance elements being connected at one end to a common juncture, a third resistance element imbedded in said protective coating and spaced from said protected resistance element, a plurality of spaced heat-radiating fins imbedded in and extending from said protective coating along the surface thereof, a source of measured current, a bridge circuit, multi-position switch means for successively connecting said protected resistance element and said exposed resistance element as adjacent resistance arms of said bridge circuit and for connecting said source of measured current to said third resistance element.

4. A device in accordance with claim 3 in which said fins comprise a series of units each of which comprises an imbedded flat cross member having its under surfaces generally parallel to and spaced from said protected resistance element, each unit having flat fin members extending through said protective coating, and said third resistance element is in the form of a coil, a portion of the loops of which pass between said fin members and over each cross member.

5. A device in accordance with claim 4 in which one of each of said flat fin members on a unit has a transverse slot and the coils of said third resistance element pass through said slot from one unit to the other.

6. A device of the character described comprising an exposed resistance element, a protected resistance element having a coating on the entire surface thereof, said resistance elements being connected at one end to a common juncture, a third resistance element imbedded in said protective coating and spaced from said protected resistance element, heat-radiating means comprising a plurality of spaced flat base members imbedded in said protective coating and spaced from said protected resistance element and said third resistance element therein, flat fin members attached to the ends of said base members and extending outwardly through said protective coating, flat top members connected between the extended ends of alternate pairs of said fin members, a source of measured current, a bridge circuit, multi-position switch means for successively connecting said protected resistance element and said exposed resistance element as adjacent resistance arms of said bridge circuit and for connecting said source of measured current to said third resistance element.

7. A device of the character described comprising a protected resistance element, an exposed resistance element, said resistance elements being connected at one end to a common juncture, a third resistance element adjacent to said protected resistance element, a bridge circuit including a fixed fourth resistance as one arm thereof, multi-position switch means for connecting and disconnecting said protected resistance element and said exposed resistance element as adjacent arms of said bridge circuit and for connecting said third resistance element and said fixed fourth resistance element as adjacent arms of said bridge circuit while said protected and exposed resistance elements are disconnected from said bridge circuit.

8. A device in accordance with claim 7 in which said protected resistance element has coating on the entire surface thereof and a plurality of spaced heat-radiating fins are imbedded in and extend from said protective coating along the surface thereof.

9. A device in accordance with claim 8 in which said fins comprise a series of units each of which comprises an imbedded flat cross member having its under surfaces generally parallel to and spaced from said protected resistance element, each unit having flat fin members extending through said protective coating, and said third resistance element is in the form of a coil, a portion of the loops of which pass between said fin members and over each cross member.

10. A device of the character described comprising a protected resistance element, an exposed resistance element, said resistance elements being connected at one end to a common juncture, a third resistance element, a source of measured current, a bridge circuit including a fixed fourth resistance as one arm thereof, multi-position switch means for connecting and disconnecting said protected resistance element and said exposed resistance element as adjacent arms of said bridge circuit, for connecting and disconnecting said source of measured current to said third resistance element and for connecting and disconnecting said third resistance element and said fixed fourth resistance element as adjacent resistance arms of said bridge circuit while said protected and exposed resistance elements and said source of measured current are disconnected from said bridge circuit.

11. A device of the character described comprising, a protected resistance element, an exposed resistance element, said resistance elements being connected at one end to a common juncture, a third resistance element adjacent to said protected resistance element, a source of measured current, a bridge circuit including a fixed fourth resistance as one arm thereof and a comparative resistance measuring means, multi-position switch means for successively connecting said protected resistance element and said exposed resistance element through said common juncture as adjacent arms of said bridge circuit whereby the corrosion rate is measured by said comparative resistance measuring means as a function of the change in cross-sectional area of said exposed resistance element in one position, and to connect said source of measured current to said third resistance element to heat same while said protected and exposed resistance elements are connected as adjacent arms of said bridge circuit whereby the difference between the ratio of the resistance of said exposed resistance element to the resistance of the unheated protected resistance element and the ratio of the resistance of the exposed resistance element and the resistance of the heated protected resistance element is measured by said comparative resistance measuring means as a function of the fluid-flow velocity in another position, and to disconnect said protected and unprotected resistance elements and said source of measured current of said bridge circuit and connect said third resistance element and said fixed fourth resistance as adjacent arms of said bridge circuit in another position whereby the temperature is measured as a function of the change of resistance of said third resistance element.

12. A device in accordance with claim 11 in which said protected resistance element has a coating on the entire surface thereof, and a plurality of spaced heat radiating fins are imbedded in and extend from said protective coating along the surface thereof.

13. A device in accordance with claim 12 in which said fins comprise a series of units each of which comprises an imbedded flat cross member having its under surfaces generally parallel to and spaced from said protected resistance element, each unit having flat fin members extending through said protective coating, said third resistance element is in the form of a coil, a portion of the loops of which pass between said fin members and over each cross member.

14. A device in accordance with claim 13 in which one of each of said flat fin members on a unit has a transverse slot and said coiled third resistance element passes through said slot from one unit to the other.

15. A test probe element comprising an elongated metallic resistance element, a protected elongated metallic resistance element having a coating on the entire surface thereof, said resistance elements being connected at one end to a common juncture, a third metallic resistance element imbedded in said protective coating and spaced from said protected resistance element, and a plurality of heat-radiating fins imbedded in said protective coating, said fins being spaced from each other and from said first and third metallic resistance elements.

16. The method of simultaneously determining the rate of corrosion and the rate of flow of a stream of fluid through a conduit comprising placing an exposed and a protected resistance element in said stream, measuring the ratio of electrical resistance of said two resistance elements which have attained substantially the same temperature as said stream at the beginning and end of an elapsed period of time, heating the protected resistance element only to a different temperature above the stream temperature, measuring the ratio of resistance of said resistance elements after heating the protected element, determining the difference in resistance ratios between the ratio of said heated and unheated elements and the ratio of both elements at stream temperature, whereby the rate of corrosion is proportional to the difference in resistance ratios at the same temperature and the flow rate is proportional to the difference in the ratio of the elements at the same temperature and the ratio at the different temperature.

17. The method in accordance with claim 16 in which the difference in the resistance ratios between the ratio of said heated and unheated elements and the ratio of both elements at stream temperature is made without any substantial lapse of time.

18. The method of simultaneously determining the rate of corrosion and the rate of flow of a stream of fluid through a conduit comprising placing an exposed and a protected resistance element of known resistance ratio in said stream, heating the protected resistance element above the stream temperature, measuring the ratio of resistance of said resistance elements after heating the protected element and before said unprotected element has corroded, terminating the heating of said protected resistance element, measuring the ratio of electrical resistance of said two resistance elements at substantially the same temperature as said stream after said exposed element has corroded, determining the difference between said ratios at the different temperatures as a measure of the flow rate of said stream and determining the difference between said known ratio and said ratio at the same temperature as a measure of the corrosion rate of said stream.

19. The method of simultaneously determining the rate of corrosion, the rate of flow and the temperature of a stream of fluid through a conduit, comprising placing an exposed resistance element and a protected resistance element having an adjacent third resistance element in said stream, said protected and exposed resistance elements having a known resistance ratio, applying a measured amount of current to said third resistance element to thereby heat the protected resistance element above the temperature of said stream, measuring the ratio of resistance of said protected and exposed resistance elements after heating the protected element and before said exposed element has corroded, terminating the heating of said protected resistance element, measuring the ratio of electrical resistance of said protected and exposed resistance elements at substantially the same temperature as said stream after said exposed element has corroded, determining the difference between said ratios at the different temperatures as a measure of the flow rate of said stream, determining the difference between said known ratio and said ratio at the same temperature as a measure of the corrosion rate of said stream and determining the changes in resistance of said third resistance element due to the heat changes imparted thereto by the stream as a measure of the temperature of said stream.

References Cited in the file of this patent

UNITED STATES PATENTS

| 2,612,047 | Nilsson et al. | Sept. 30, 1952 |
| 2,695,219 | Upham | Nov. 23, 1954 |
| 2,813,237 | Fluegal et al. | Nov. 12, 1957 |
| 2,864,252 | Schaschl | Dec. 16, 1958 |